United States Patent [19]

Blazquez

[11] 4,031,989
[45] June 28, 1977

[54] DOUBLE EFFECT HYDRAULIC SHOCK ABSORBER

[76] Inventor: Antonio Giner Blazquez, Lepanto 194 5°-1ª, Barcelona 13, Spain

[22] Filed: Feb. 3, 1976

[21] Appl. No.: 654,872

[30] Foreign Application Priority Data

Feb. 22, 1975 Spain .................. 435006
Dec. 18, 1975 Spain .................. 443663

[52] U.S. Cl. .......................... 188/299; 188/315; 188/322
[51] Int. Cl.² .................................... F16F 9/46
[58] Field of Search .......... 188/279, 281, 299, 315, 188/322; 137/511, 599

[56] References Cited

UNITED STATES PATENTS

| 725,456 | 4/1903 | Lemp | 188/299 |
| 2,504,435 | 4/1950 | Matteson | 137/599 |
| 2,948,357 | 8/1960 | Cookson | 188/299 |
| 3,040,841 | 6/1962 | Schultze | 188/299 |
| 3,532,194 | 10/1970 | Jackson | 188/299 |
| 3,874,487 | 4/1975 | Keijzer et al. | 188/322 |

FOREIGN PATENTS OR APPLICATIONS 1,363,303  8/1974  United Kingdom ............... 188/322

*Primary Examiner*—Trygve M. Blix
*Assistant Examiner*—Edward R. Kazenske
*Attorney, Agent, or Firm*—Wenderoth, Lind & Ponack

[57] ABSTRACT

A double effect hydraulic shock absorber includes a system for varying the resistance of the compression cycle of the shock absorber. Two different compression loads are obtained by joining the inner chamber of the shock absorber to the outer annular chamber through two groups of exhaust ducts, each of the groups of exhaust ducts being controlled by unidirectional valves set at different pressures or strengths. The ducts set at a lesser pressure are provided with a blocking device capable of closing such ducts, thus leaving as the only outlet for the expelled oil the ducts set at a higher pressure. The blocking device includes an electromagnet which axially activates the blocking element, thus closing or leaving free the inlet of the weak exhaust ducts.

4 Claims, 4 Drawing Figures

DOUBLE EFFECT HYDRAULIC SHOCK ABSORBER

BACKGROUND OF THE INVENTION

Automobiles are so constructed that they form a floating assembly on rolling elements, i.e. the chassis is isolated from the wheels by flexible elements, such as leaf springs, torque arms, helical springs, rubber blocks, etc., which make the chassis, wherein the cab of the vehicle is erected, independent of the wheels and their axles, thereby contributing decidedly to the comfort of the passengers and/or to the security of the transported load.

In order to accommodate the diverse and brusque reactions of the flexible elements, it is necessary to arrange a control element between the chassis and the supports of the axles of the wheels, which control element is a shock absorber.

The shock absorber is incorporated to the vehicle by means of two anchors, one of which fixes the shock absorber to the axle of the wheels, and the other of which fixes the shock absorber to resistant points of the chassis of the vehicle.

The working cycle of the shock absorber is two stage, thus the use of the denomination of a "double effect" shock absorber. This working cycle differs, depending on the needs of the vehicle, which needs are imposed by the load and the features of the terrain over which the vehicle travels. One of the effects of the shock absorber is that of resistance to descent, while the other effect is that of retention from ascent.

The resistance effect is produced when the vehicle encounters in its travel a pothole and, consequently, the vehicle, the low wheel and the weight of the vehicle fall therein, which fall is controlled by the shock absorber so that movement can be produced smoothly.

The retention effect is produced as a result of the resistance effect, and is provoked by the suspension system which, after being compressed, distends, or attempts to return, violently in the opposite direction.

This violent return must be controlled by the shock absorber by damping the return movement so that it is produced very slowly.

From the above it can be seen that the function of the shock absorber is at all times to control the flexible effect of the suspension system, while joining the chassis of the vehicle to the axle of the wheels, thus forming a safe and stable assembly.

Conventionally, the double effect telescopic hydraulic shock absorber is constituted from two tubular, concentric bodies which form two chambers, i.e., inner and outer chambers. The inner chamber is cylindrical and is filled with oil, while the outer chamber is annular and constitutes an oil reservoir.

Both tubular bodies have a common base which closes them at one side, while at the other side they are provided with independent bases.

A piston moves along the interior of the central tubular body, which piston divides the inner chamber into two volume-defined inner chambers and which piston includes a double set of one-way, oppositely-acting valves.

The piston is attached to a rod which, in perfect adjustment, slides along a housing provided in the common base of the two tubular bodies, the rod having at the end thereof opposite to the piston, an anchor by which it is fixed to the chassis of the vehicle.

The outer tubular body has an anchor situated at the end thereof opposite to that along which the rod slides, by which the tubular body is fixed to the axle of the wheel.

The movements of the suspension system are transferred to the rod which makes the piston slide along the inner chamber.

The movement of the piston is impeded by the oil contained in the inner chamber, which oil is forced to pass from one to the other of the two chambers separated by the piston and forming the inner chamber.

This transfer from one chamber to the other occurs through the one-way, oppositely-acting valves provided in the piston.

When the piston advances, a portion of the oil is transferred from one inner chamber to the other, with the exception of an amount of oil which corresponds to the volume of the rod introduced in the other inner chamber. This amount of oil is expelled by a valve device towards the outer annular chamber and is subsequently recovered therefrom by suction when the piston is displaced in the opposite direction.

The valve device which connects the inner chamber and the annular chamber is arranged in the inner tubular body, and is precisely situated at the end thereof opposite the piston rod.

Evidently, the one-way device which opens when the piston advances towards the end opposite to the rod has a higher sensitivity than the one-way valve device which acts in the opposite direction. This is due to the fact that the advancement of the piston towards the end opposite the rod is effected when the frame and chassis are displaced towards the ground, that is when they are lowered. This movement is smoothly controlled by the suspension system of the vehicle in cooperation with the shock absorber. However, the displacement of the piston in the direction toward the rod end is effected when the vehicle tends to bounce, this bouncing being controlled by a higher resistance to oil passage.

As the rate of displacement of the vehicle increases, the function to be performed by the shock absorber also increases, thus adjusting the flexible effects of the suspension system, therefore requiring the shock absorber to effect a greater control of the suspension system, so that the effects of resistance to descent and retention from ascent are maintained.

When the effect of resistance to descent increases, damping becomes harder, and therefore travelling at a slow speed becomes uncomfortable. However, when the resistance effect diminishes, the suspension system becomes more comfortable when travelling at slow speeds. This gives rise to the fact that two types of telescopic shock absorbers are preferably used, one for use in sports cars and high speed vehicles and the other for conventional, slower use.

SUMMARY OF THE INVENTION

The object of the present invention is to provide an improved double effect hydraulic shock absorber wherein the resistance to descent of the shock absorber can be varied to increase or decrease the resistance force, thereby making damping of the vehicle smoother or harder.

This object is achieved according to the present invention by providing a variable adjustment of the compression cycle of the shock absorber to obtain two different compression loads by joining the volume-defined chamber or inner chamber of the shock absorber to the outer annular chamber by two separate groups of exhaust ducts, in addition to the conventional recuperation ducts, each one of the exhaust duct groups being controlled by unidirectional valves adjusted to be operable at different pressures. The group of ducts adjusted to be operable at a lesser pressure, i.e., the weak valve ducts, should be provided with a blocking device capable of closing such ducts and leaving, as the only outlet for the expelled oil to compensate for the volume occupied by the piston rod, those ducts the valve elements of which are stronger. The blocking element is an electromagnet concentrically arranged between the inner chamber and the outer annular chamber. The electromagnet activates the blocking device axially, thus closing or opening the entrance of the weak exhaust valve ducts.

A conventional manual control may be used to activate the coil of the electromagnet and would be situated within reach of the driver so that, depending on the speed, load and conditions of the terrain on which the vehicle travels, the driver can selectively choose the damping rate which he deems better.

Independently of the manual control, other controls can be installed, such as inertia switches which, depending on the breaking forces or on the centrifugal forces encountered on curves, acts on a pair of shock absorbers to increase the resistance effect.

Another embodiment of the invention arranges the blocking element, which controls the ducts which join the inner chamber to the outer annular chamber, within a block or valve body which has an annular cavity concentric with the axis of symmetry of the shock absorber. The valve body operates to fix and position the tubular body which forms the inner chamber.

The annular cavity acts as a housing for the electromagnetic coil which acts on a tamper which, in the position thereof during activation of the coil, leaves the inlet of the weak exhaust ducts free, and in the position thereof during deactivation of the coil, closes the inlet of the weak exhaust ducts and consequently places the strong exhaust ducts in operation.

Furthermore, concentrically with the axis of symmetry of the shock absorber, there is provided a central duct which leads to a collector common to all the exhaust ducts. The collector forms a housing and a guide for the tamper, which is controlled by the coil as above stated and opens and closes the exhaust ducts.

BRIEF DESCRIPTION OF THE DRAWINGS

For a better understanding of the characteristics of the improvements in dual effect hydraulic shock absorbers in question, a set of drawings is attached to the present specification, forming an integral part thereof, wherein the following is represented.

DETAILED DESCRIPTION OF THE INVENTION

Figure 1:
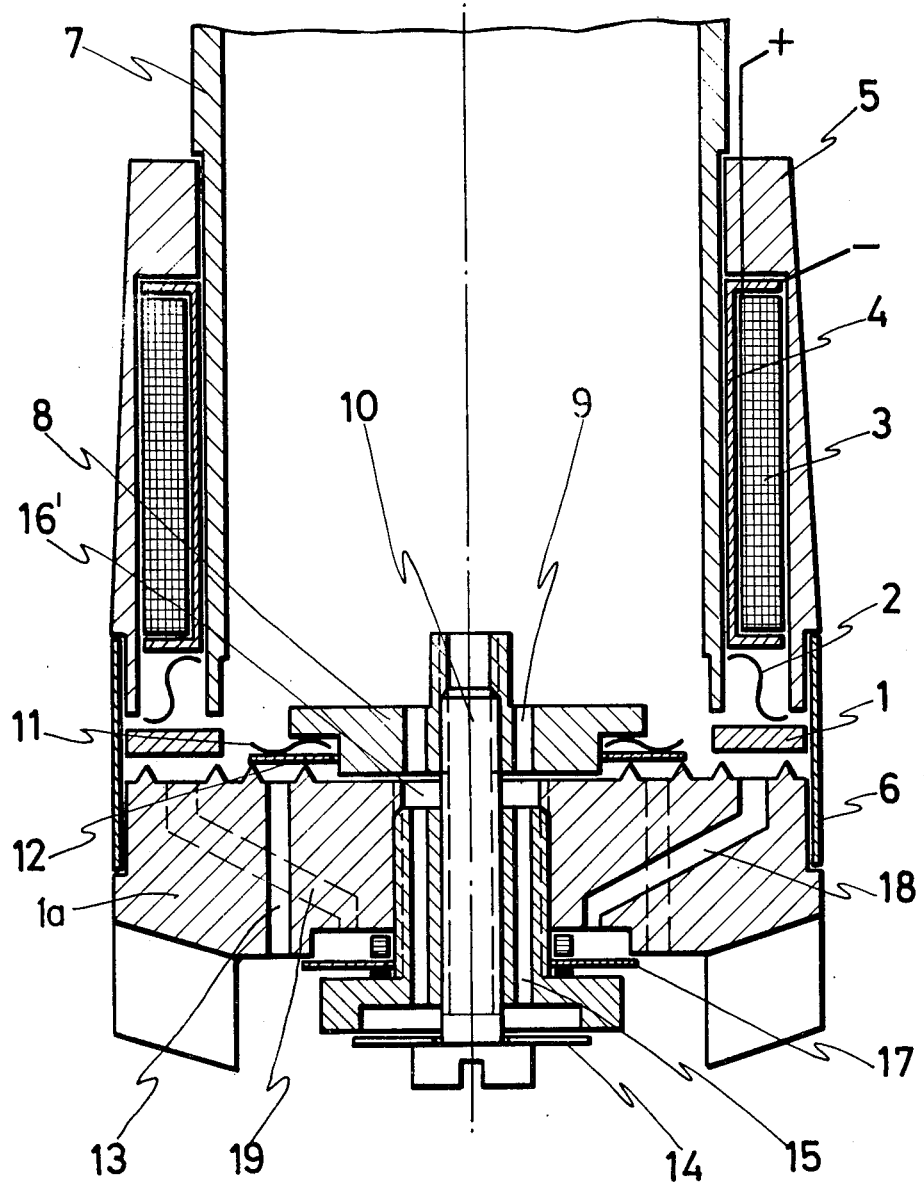
FIG. 1 is a longitudinal section, illustrating in detail the expulsion of oil through different groups of ducts and the subsequent recovery through a conventional duct, of a first embodiment of the invention.
Figure 2:
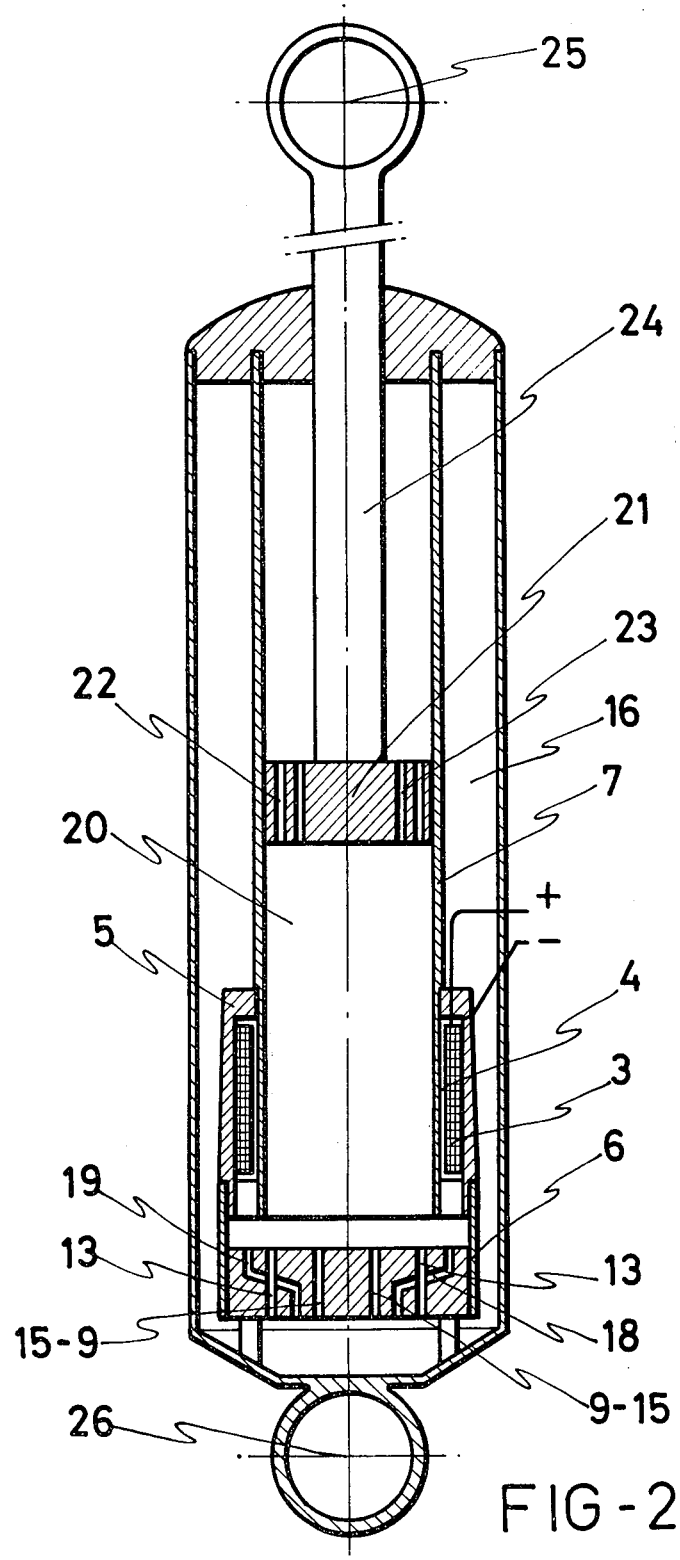
FIG. 2 is a longitudinal section showing the complete shock absorber, but illustrating only schematically the detailed structure of FIG. 1.

FIGS. 1 and 2 illustrate a shock absorber having a closure or blocking element 1 for blocking the weak or lesser pressure exhaust valve and ducts 18 and 19. Spring 2 is arranged between element 1 and the coil of the electromagnet 3 and constantly urges element 1 to close the weak valve.

Coil 3 is located, together with an isolating support element 4, in an annular chamber defined by an outer shell or framework 5 and inner tube or core 7 which forms the main cylinder of the shock absorber. A separating element 6 is provided as a projection of outer shell 5.

A body member 1a has extending therethrough the above mentioned weak ducts 18 and 19 as well as strong valve ducts 9 and 15.

A stud 10 extends through body member 1a and has fixed thereto a nut 8 which adjusts the setting of a strong valve which includes a sealing washer 14 which closes strong ducts 15 which connect via annular chamber 16' with ducts 9 through nut 8.

By-pass or return ducts 13 of a fluid return valve extend through body member 1a and are blocked by sealing washer 12 which is urged to a blocking position by spring 11.

The weak valve ducts 18 and 19 are closed at the bottom ends thereof by bending washer 17, the strength of which is less than that of sealing washer 14 of the strong valve.

In FIG. 2 there is shown the central or main chamber 20 within which the piston 21, solidly fixed to the rod 24, slides. The outer end of rod 24 is attached to anchoring element 25 which, together with the anchoring element 26, constitute the means for attaching the shock absorber in the desired operative position.

The mentioned piston 21 has passing therethrough ducts 22 and 23 having oppositely-acting one-way valves.

The operation of the embodiment of FIGS. 1 and 2 is as follows.

When piston 21 descends, motivated by the abrupt fall of the chassis toward one of the wheels of the vehicle, oil contained in the lower part of chamber 20 passes through the ducts 22 to occupy the upper part of chamber 20.

Since the volume of this upper chamber is partially occupied by the rod 24, a portion of oil will pass to the outer annular chamber 16 through the ducts 18 and 19, when blocking element 1 is positioned to open ducts 18 and 19.

Once the suspension system of the vehicle begins to return to its normal position, piston 21 is displaced in an opposite or upward direction, thus causing the oil which had previously been expelled to the annular chamber 16 to be suctioned through ducts 13 back into chamber 20, and oil contained in the upper chamber above piston 21 to simultaneously pass to the lower chamber 20 through the valve ducts 23.

The above working cycle is the normal cycle and is effected by use of the weak exhaust ducts 18 and 19 while the electromagnet 3 is activated. However, when electromagnet 3 is deactivated, ducts 18 and 19 are sealed, thus preventing the passage of oil therethrough. The oil is then forced, during descent of the piston 21, through the strong exhaust ducts 9 and 15, whereby the shock absorber is transformed from a weak resistance to a strong resistance device which is ideal for high speeds and loads.

It is necessary to point out that the shock absorber always operates under compression. That is, adjustment from weak to strong is obtained by changing the sensitivity of the exhaust valves during the transference of the oil from the inner chamber 20 to the outer annular chamber 16.

Figure 3:
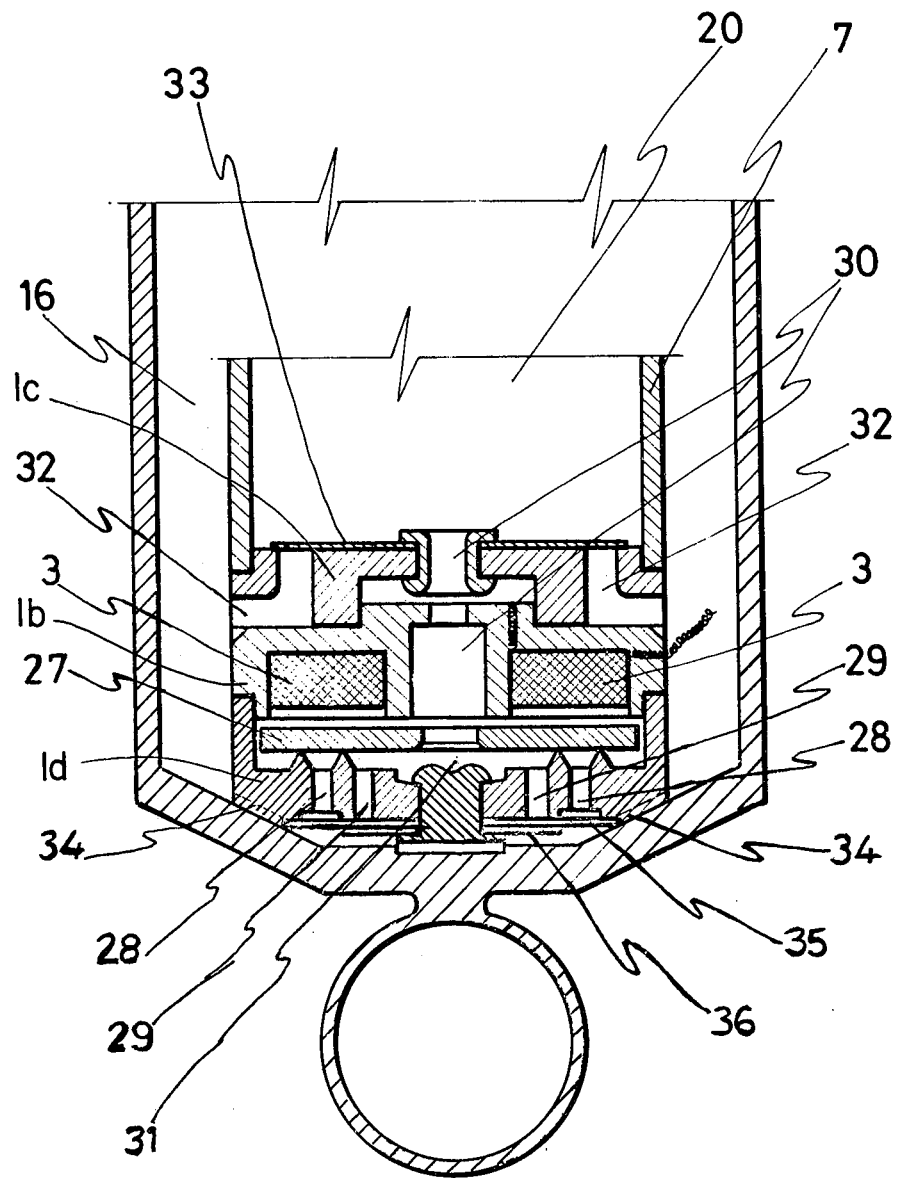
FIG. 3 is a view similar to FIG. 1, but of a second embodiment of the invention.
Figure 4:
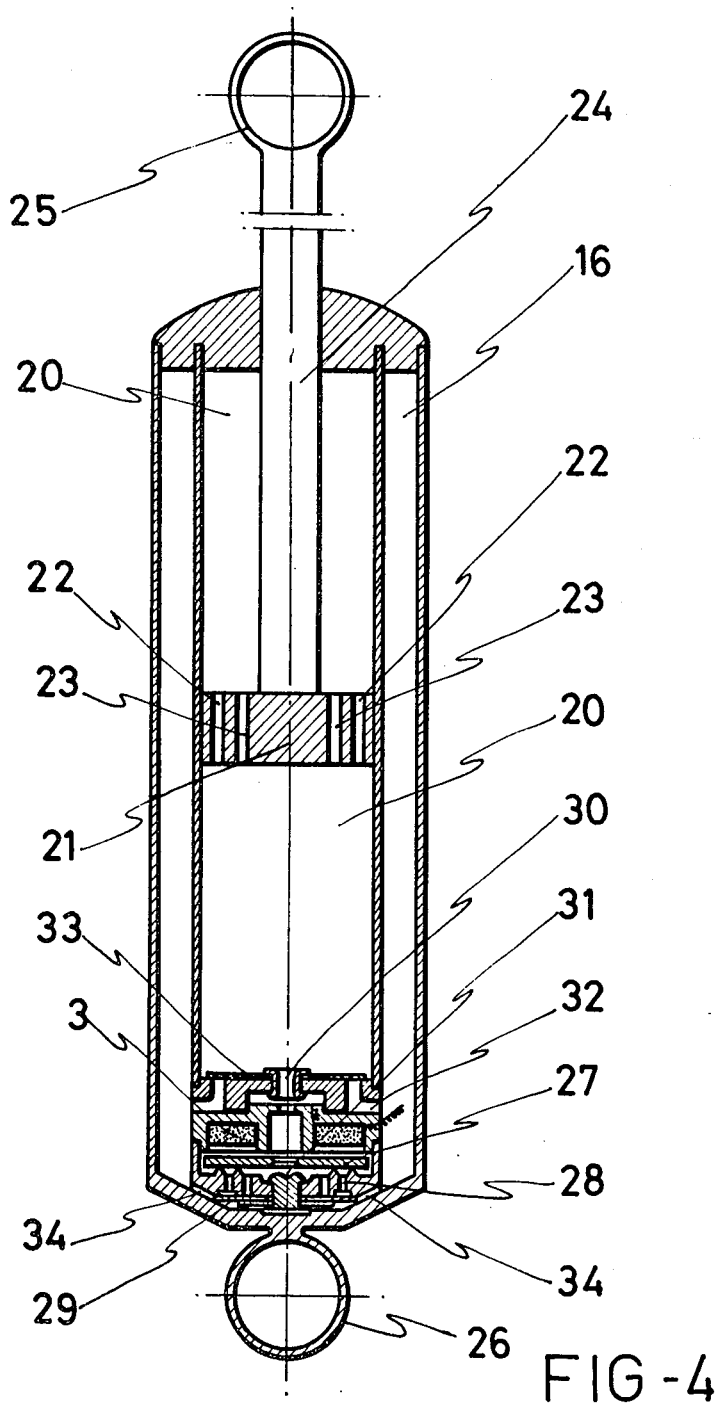
FIG. 4 is a view similar to FIG. 2, but of the second embodiment of the invention.

Referring now to FIGS. 3 and 4, which illustrate a second embodiment, it can be seen that the electromagnetic coil 3 is housed in an annular cavity defined in a body member 1b of a body assembly which also includes body member 1c which fixes and positions the inner tubular body 7 which defines the inner chamber 20.

The body assembly also includes a body member 1d having therethrough ducts 28 and 29.

The coil 3 is situated immediately above a sealing tamper or blocking element 27 housed in a collector chamber 31 within the body assembly and to which the ducts 28 and 29 lead. Ducts 28 are weak valve ducts since they are closed by a single closure 35. Ducts 29 are strong valve ducts since they are closed by a double closure including closures 35 and 36.

A central oil expulsion duct 30 extends through body members 1b and 1c to collector chamber 31. Ducts 32 extend from annular chamber 16 through body member 1c into inner chamber 20 for the return of oil. Ducts 32 are closed by closure 33. By-pass holes 34 extend through body member 1d from the exhaust ducts 28 and 29 to the outer annular chamber 16.

As shown in FIG. 3, when the sealing tamper or blocking element 27 is in a rest position thereof, when the electromagnetic coil 3 is deactivated, oil expelled from chamber 20 will always leave through the strongly adjusted exhaust ducts 29, since the weakly adjusted exhaust ducts 28 are closed by the sealing tamper 27.

The operation of the embodiment of FIGS. 3 and 4 is as follows.

When piston 21 descends, a portion of the oil contained in the lower part of the chamber 20 passes through the one-way ducts 22 into the upper part of the chamber above piston 21.

Since the volume of the upper portion of chamber 20 is partially occupied by the rod 24, a portion of the oil will pass through the duct 30 and collector chamber 31 to the strongly adjusted exhaust ducts 29. The oil will deflect closures 35 and 36 and pass from ducts 29 through by-pass holes 34 into the outer annular chamber 16.

When the piston 21 is displaced in the opposite direction, suctioning of the oil which had previously been expelled to the outer annular chamber 16 will occur through return ducts 32 by deflecting closure 33 which prevents oil leakage during the compression cycle.

The cycle described above occurs when coil 3 is deactivated and the sealing tamper 27 is at rest closing the weakly adjusted ducts 28. However, when the coil 3 is activated, ducts 28 are opened, and the oil, when the piston 21 is compressed, tends to escape through ducts 28, since the closure 35 is weaker than the combination of closures 35 and 36 which seal the outlets of ducts 29.

Modifications may be made to the above specifically described structural arrangements without departing from the scope of the invention.

I claim:

1. A double effect shock absorber comprising:
an inner tube defining an inner chamber having fluid therein;
an outer tube concentric with said inner tube and defining therewith an annular outer chamber;
a piston attached to a rod which extends through one end of said inner tube and movable within said inner chamber;
a body assembly attached to the other end of said inner tube and thereby closing said inner chamber at said other end of said inner tube;
said body assembly including a first body member having therein an annular chamber;
an electromagnet positioned within said annular chamber of said first body member;
said body assembly including a second body member attached to said first body member and defining therewith a collection chamber in permanent communication with said inner chamber;
first and second exhaust duct means extending through said second body member and connecting said outer annular chamber with said collection chamber;
first closure valve means for closing said first exhaust duct means;
second closure valve means for closing said second exhaust duct means, said second closure valve means having a stronger resistance to opening than said first closure valve means; and
blocking means positioned within said collection chamber, for blocking said first exhaust duct means when said electromagnet is deactivated, and for opening said first exhaust duct means when said electromagnet is activated;
whereby, when said electromagnet is activated, movement of said piston within said inner chamber toward said body assembly will cause said fluid to pass through said first exhaust duct means and open said first closure valve means to pass to said outer annular chamber, while said second closure valve means closes said second exhaust duct means;
whereby, when said electromagnet is deactivated, movement of said piston within said inner chamber toward said body assembly will cause said fluid to pass through said second exhaust duct means and open said second closure valve means to pass to said outer annular chamber, while said first exhaust duct means remain closed by said blocking means.

2. A shock absorber as claimed in claim 1, wherein said blocking means comprises a circular-shaped plate element having a central aperture therethrough.

3. A shock absorber as claimed in claim 1, wherein said body assembly further comprises a third body member attached to said first body member and to said inner tube, said third body member having extending therethrough return duct means for returning fluid from said outer annular chamber to said inner chamber upon movement of said piston within said inner tube in a direction away from said body assembly, and closure means for closing said return duct means upon movement of said piston toward said body assembly.

4. A shock absorber as claimed in claim 1, comprising a first deflectable closure element attached to said second body member and covering both said first and second exhaust duct means, and a second deflectable closure element attached to said second body member and covering only a portion of said first deflectable closure element covering said second exhaust duct means, said first closure valve means comprising that portion of said first deflectable closure element which covers said first exhaust duct means and which is not covered by said second deflectable closure element, and said second closure valve means comprising said second deflectable closure element and that portion of said first deflectable closure element which is covered by said second deflectable closure element.

* * * * *